April 23, 1963
F. MAINZ
3,086,375
METHOD AND APPARATUS FOR PRODUCING MULTIPLE GLASS SHEET GLAZING UNITS
Filed Nov. 5, 1959
3 Sheets-Sheet 1
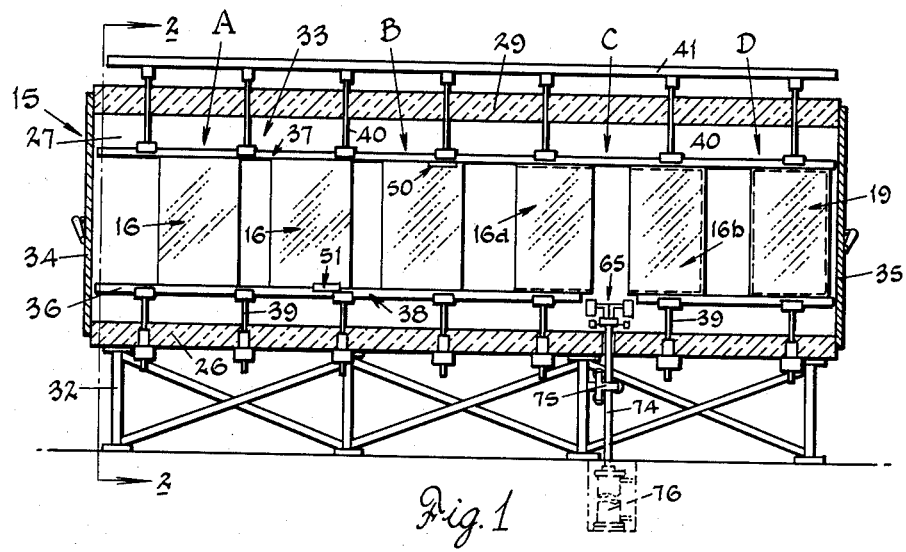
Fig. 1
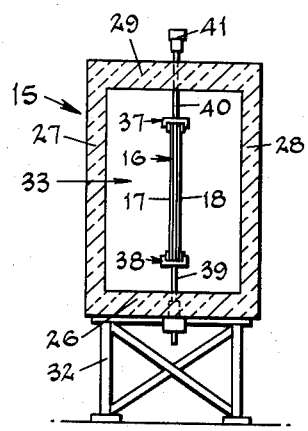
Fig. 2
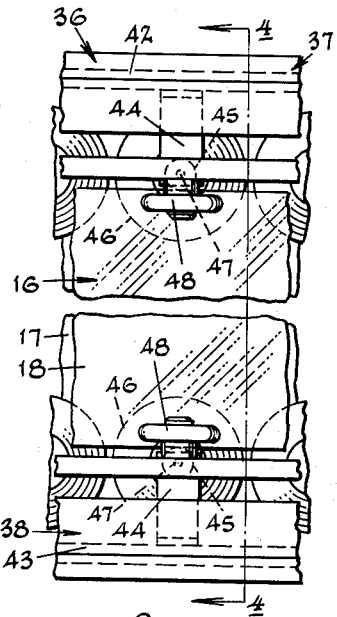
Fig. 3
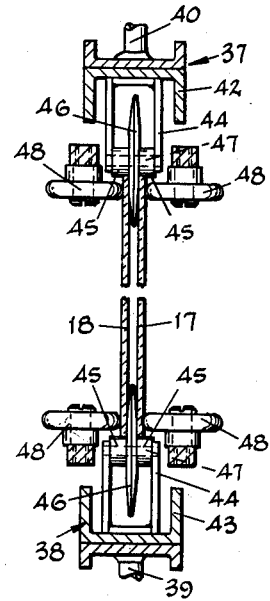
Fig. 4
Fig. 10
INVENTOR.
Franz Mainz
BY
Nobbe & Swope
ATTORNEYS April 23, 1963 F. MAINZ 3,086,375
METHOD AND APPARATUS FOR PRODUCING MULTIPLE
GLASS SHEET GLAZING UNITS
Filed Nov. 5, 1959 3 Sheets-Sheet 2

INVENTOR.
Franz Mainz
BY
Nobbe & Swope
ATTORNEYS

April 23, 1963

F. MAINZ 3,086,375

METHOD AND APPARATUS FOR PRODUCING MULTIPLE
GLASS SHEET GLAZING UNITS

Filed Nov. 5, 1959

INVENTOR.
Franz Mainz
BY
Nobbe & Swope
ATTORNEYS

United States Patent Office 3,086,375
Patented Apr. 23, 1963

3,086,375
METHOD AND APPARATUS FOR PRODUCING MULTIPLE GLASS SHEET GLAZING UNITS
Franz Mainz, Witten (Ruhr), Germany, assignor to Libbey-Owens-Ford Glass Company, Toledo, Ohio, a corporation of Ohio
Filed Nov. 5, 1959, Ser. No. 851,082
8 Claims. (Cl. 65—58)

The present invention relates broadly to the manufacture of all-glass multiple sheet glazing units and more particularly to an improved method of and apparatus for controlling the atmosphere within such a glazing unit during the manufacture thereof.

The general type of glazing unit with which this invention is concerned comprises spaced parallel sheets of glass that are sealed together around the edges thereof to form a dead-air space therebetween which may be filled with dehydrated air or other gases before being hermetically sealed. Such multiple glass sheet glazing units are well known and have been widely used to reduce heat transfer and to prevent condensation of moisture upon the glass in glazed openings.

According to one method of manufacturing all-glass multiple sheet glazing units, two sheets of glass are arranged in spaced face-to-face relation in a vertical position and conveyed along a definite path through a furnace in which the edge portions of the sheets are sealed together to form a continuous edge wall around the periphery of the unit. During such movement, the upper and lower marginal edge portions of the glass sheets are heated to a semi-plastic condition by gas burners disposed opposite said marginal edge portions and are then passed between a pair of forming rolls which press the softened edge portions into fusion contact with one another to form an integral edge wall. The glass sheets, when thus joined or welded together to provide upper and lower horizontal edge walls, are advanced to a second sealing station where the spaced-apart vertical edge portions of the glass sheets are sealed or welded to one another by a vertically moving heating and sealing device including oppositely disposed gas burners and pairs of forming rolls to fuse or weld the spaced side edges of the sheets together.

It has been found that in such a process the strength or resistance of the sealed edge walls to breakage can be materially increased by the application of heat to the inside surfaces of the marginal edge portions of the glass sheets as said edge portions are welded together. This has been accomplished by the use of so-called inside burners which are located between the glass sheets and which operate to render the inside sheet surfaces sufficiently plastic to flow into and fill the void created between the outwardly flaring surfaces of the sheets from the integrally sealed edge thereof. This results in the formation of an internal fillet or arch-shaped reinforcement in the area or areas of the unit that are most susceptible to breakage. While the waste products of combustion from the inside gas burners may readily escape from between the glass sheets during the sealing of the upper and lower edges thereof, it has been found that during the sealing of the vertical side edges of the sheets, the waste gaseous products, unless neutralized or carried away, will tend to remain between the spaced sheets and condense on the inside surfaces thereof as the unit is being annealed which oftentimes results in the staining of the sheet surfaces. This is highly objectionable since such stains are almost impossible to remove during the subsequent processing of the unit.

It is, therefore, a primary object of this invention to effectively overcome this difficulty by the provision of a novel method of and apparatus for improving the quality of all-glass multiple sheet glazing units by eliminating this staining of the sheet surfaces.

Another object of the invention is to provide an improved method of and apparatus in the manufacture of all-glass multiple sheet glazing units by which condensation of moisture upon the inner sheet surfaces resulting from the use of the inside gas burners is materially reduced, if not completely eliminated.

A further object of the invention is to provide an improved method of and apparatus for manufacturing all-glass multiple glazing units of the above character in which dehydrated air under pressure is introduced into the space between the glass sheets while certain of the edge portions thereof are being heated and sealed to one another whereby to purge the space between the glass sheets and thereby lower the moisture content of the enclosed air space of the unit.

Other objects and advantages of the invention will become more apparent during the course of the following discription, when taken in connection with the accompanying drawings.

In the drawings, wherein like numerals are employed to designate like parts throughout the same:

FIG. 1 is a vertical longitudinal sectional view through a furnace employed in the manufacture of all-glass multiple sheet glazing units in accordance with the present invention;

FIG. 2 is a vertical transverse sectional view of the furnace taken on line 2—2 of FIG. 1;

FIG. 3 is a fragmentary elevation of a conveyor on which pairs of glass sheets are carried through the furnace;

FIG. 4 is a vertical transverse sectional view taken on line 4—4 of FIG. 3;

FIG. 10 is a fragmentary cross-sectional view of a portion of a glazing unit produced according to the invention.

Figure 5:
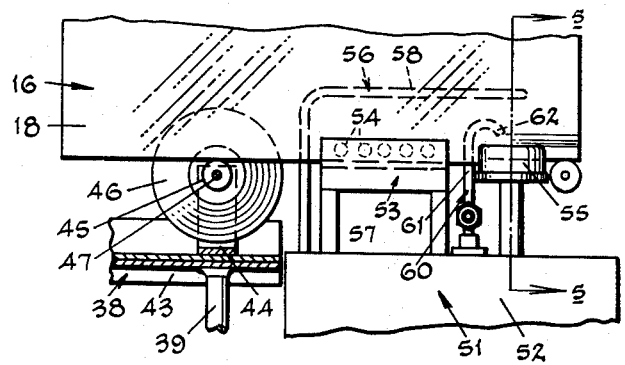
FIG. 5 is a fragmentary elevation of the sealing device for welding the lower horizontal edges of the glass sheets together.

Referring now to the drawings, and particularly to FIGS. 1 and 2, the numeral 15 designates a continuous tunnel type furnace in which pairs 16 of spaced glass sheets 17 and 18 are introduced and in which the marginal edge portions of the sheets are heated and fused to one another. Briefly, the furnace 15 includes a receiving and preheating zone A, a first sealing zone B, a second sealing zone C and a final zone D in which the sealed glazing units 19 are annealed and cooled to room temperature.

An all-glass multiple sheet glazing unit 19, fabricated according to the invention in the furnace 15, is shown in FIG. 10 and comprises the spaced sheets of glass 17 and 18, the marginal edge portions of which are bent toward one another and fused or welded together to form a sealed edge wall 20. The sheets are fused together along their edges substantially midway between the sheets and have a substantially uniform inner radius of seal or fillet 21 along said edge portions and a projection 22 extending outwardly from the fusion line between the edge portions and around the entire periphery of the unit. When the edges of the four sides of the glass sheets have thus been sealed together, an air space or chamber 23 is provided between the spaced glass sheets which is subsequently filled with dehydrated air or other gas.

It has been found, in making such units according to one known process, that the application of heat to the inside surfaces of the marginal edge portions of the glass sheets along the line of junction or fusion thereof and as the edge walls are being formed, results in increasing the strength of the edge walls and their resistance to breakage. This is believed due to the fact that the heating of the inside surfaces of the marginal edge portions of the sheets causes the glass to flow together in a manner to create the inside fillet or arch-shaped reinforcement 21 of uniform radius. This heating of the inside surfaces of the sheet edge portions during the formation of the edge walls is accomplished by the use of so-called inside gas burners which are located between the sheets and heat the edge portions thereof as said edge portions are brought together into fusion contact. While the use of these inside burners is of decided advantage in the formation of the edge walls, they also have one disadvantage in that the waste products of combustion from the gas flames are gradually entrapped within the space between the glass sheets and, if allowed to remain therein, tend to stain the inner surfaces of the glass sheets during subsequent annealing and cooling.

As pointed out above, it is the aim of the present invention to purge the space between the glass sheets with dehydrated air during the heating and fusing of certain of the edge portions of the sheets together whereby the condensation of moisture resulting from the use of the inside gas flames will be materially reduced, if not completely eliminated, and thereby minimize the liability of staining of the inside sheet surfaces between the time the edges are sealed together and the unit is annealed.

Referring more particularly to FIGS. 1 and 2 of the drawings, the furnace 15 comprises a continuous tunnel-like structure formed with a bottom wall 26, side walls 27 and 28 and a top wall 29. The furnace is supported on a framework 32 and the several walls of the structure enclose a working chamber 33 into which pairs 16 of glass sheets 17 and 18 to be sealed are introduced through a door 34 at the entrance end of the furnace and from which the sealed glazing units are removed through a door 35 at the exit end thereof. The furnace is equipped with suitable sources of heat to effect the desired preheating of the glass sheets prior to the sealing of the edge portions thereof.

Upon entry of a pair of glass sheets 17 and 18 into the preheating zone A of the furnace, the upper and lower edges thereof are received between a conveyor system generally designated by the numeral 36. As shown in FIGS. 3 and 4, this conveyor system includes an upper track 37 and a lower track 38 vertically spaced apart according to the vertical dimension of the glass sheets 17 and 18. The upper track 37 is substantially of the same structure as the lower track 38 but is, of course, in inverted relation thereto. More particularly, the lower track 38 is supported by rods 39 suitably mounted in the bottom wall 26 of the furnace. On the other hand, the track 37 is carried by rods 40 passing through the top wall 29 and being attached at their upper ends to an adjustably mounted support beam 41. By means (not shown), the beam 41 is adapted to be raised or lowered to vary the distance between the tracks 37 and 38 and thus enable the furnace to accommodate glass sheets of differing vertical dimensions.

The tracks 37 and 38 comprise base channel members 42 and 43 to which the rods 40 and 39 respectively are attached. Each track also includes a plurality of longitudinally spaced, vertically disposed bearing brackets 44 between the legs of which support rollers 45 and a spacing roll 46 are rotatably mounted on an axle 47. The pairs of glass sheets, disposed in a vertical position, are adapted to be moved forwardly through the furnace along a substantially horizontal path, with the lower edges of the sheets being supported on the lower rollers 45 and the upper edges thereof engaging the upper rollers 45. Guide rollers 48 are employed in conjunction with the spacing rolls 46 to support the glass sheets 17 and 18 in spaced parallel relation and for yieldably urging the sheets against the spacing rolls 46 to maintain the proper spacing between the sheets.

Each pair of glass sheets 16, after introduction into the preheating zone A of the furnace, is moved forwardly into the first sealing zone B by means of any suitable type of conveyor or pusher means. This sealing zone B includes two fusing or sealing devices, generally designated by the numerals 50 and 51. These sealing devices 50 and 51 are located so as to operate on the upper and lower horizontal edges respectively of the glass sheets in sequentially occurring operations, as shown in FIG. 1, or the devices may be arranged so that the upper and lower horizontal edges of the sheets will be simultaneously heated and welded to form sealed edge walls.

Figure 6:
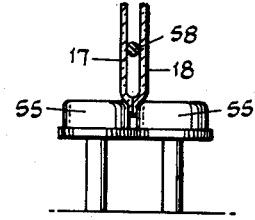
FIG. 6 is a vertical transverse sectional view taken on line 6—6 of FIG. 5.

The sealing devices 50 and 51, although mounted in opposed relation, are of generally the same construction so that the device 51 illustrated in FIGS. 5 and 6 will be described as applying to either device. The sealing device 51 is mounted on a platform 52 and comprises essentially a pair of fusion gas burners 53 positioned at opposite sides of the path of travel of the glass sheets and equipped with outlet nozzles 54, and a pair of edge forming rolls 55. As the glass sheets move forwardly, the lower marginal edge portions thereof pass between the burner nozzles 54 and are heated to softening temperature so that upon continued movement of the sheets the softened edge portions thereof will pass between the forming rolls 55 which urge the heated edge portions of the sheets toward and into fusing contact with one another to form a sealed edge wall (FIG. 6).

In order that the desired width of the space 23 between the glass sheets 17 and 18 will be maintained in the areas immediately above the edge forming rolls, each platform 52 is provided with an L-shaped spacer rod 56; the vertically disposed leg 57 of which is secured to said platform ahead of the burners 53 and passes upwardly between the spaced edges of the glass sheets while the horizontal leg 58 is bent to extend horizontally between the glass sheets and preferably is of a length sufficient to maintain the sheets properly spaced until the edges thereof have passed between the forming rolls 55 and are integrally joined to one another.

As above described, to facilitate the formation of an edge wall having a substantially uniform inner radius of seal 21 as shown in FIG. 10, an additional gas burner 60 is provided on the sealing devices 50 and 51. This burner is situated between the burners 53 and edge forming rolls 55 and comprises a vertically disposed pipe 61 received between the spaced edges of the glass sheets, with the tip 62 thereof being directed toward the edges of the sheets to be fused together. The particular curvature described by the tip portion 62 of burner 60 enables the flame therefrom to be directed against the edge walls as they are being formed by the rolls 55 whereby the residual heat therein is further raised to effect the formation of the arch-shaped reinforcing fillet 21.

Figure 7:
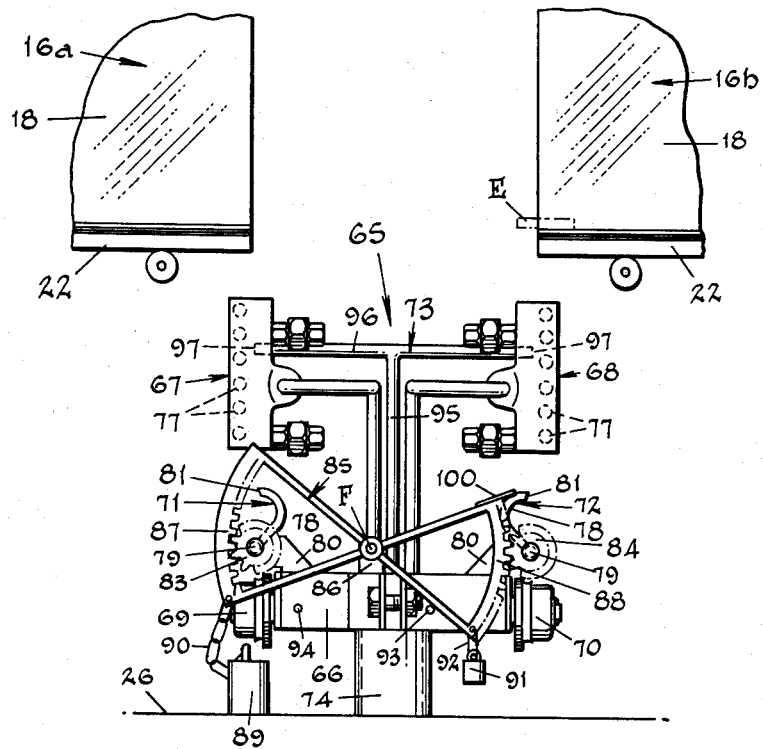
FIG. 7 is an elevational view of the sealing device for welding the vertical edges of the glass sheets together and showing the sealing device in its inoperative position.
Figure 9:
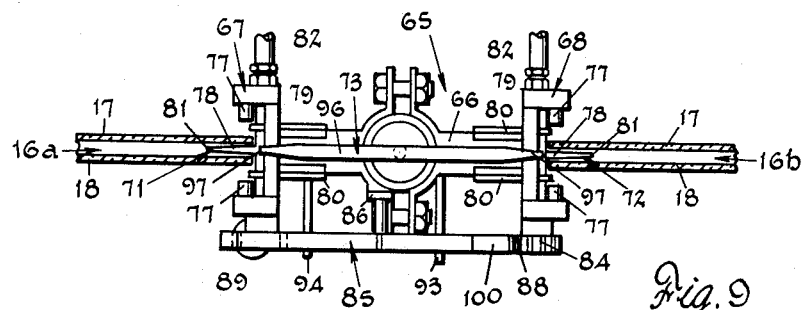
FIG. 9 is a horizontal sectional view taken on line 9—9 of FIG. 8.
Figure 8:
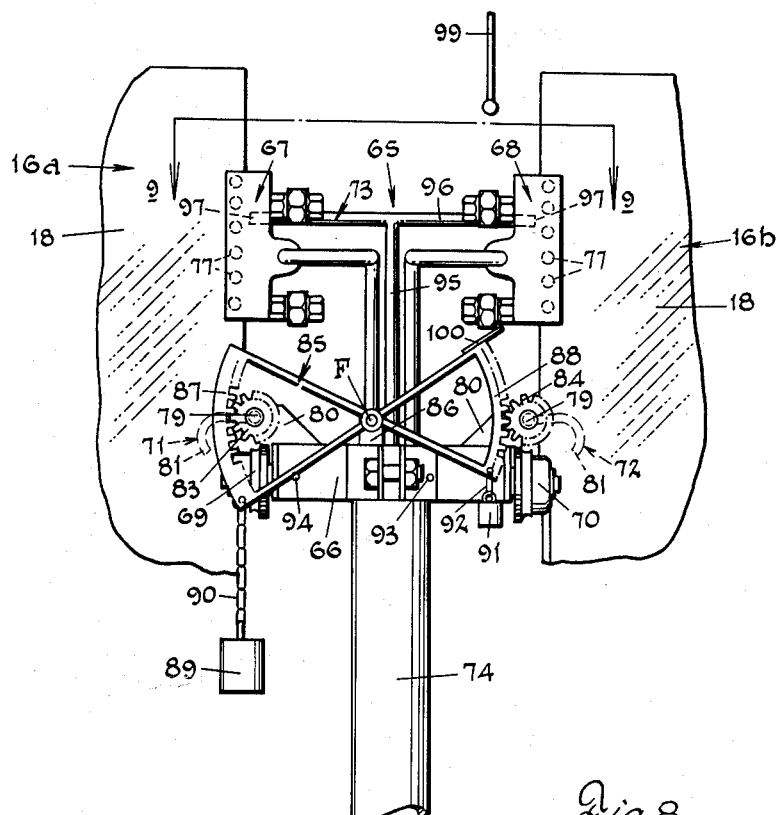
FIG. 8 is a similar elevational view of the sealing device as the same is moved upwardly relative to the vertical side edges of the glass sheets.

After the upper and lower edges of the glass sheets have been fused together, the sheets pass forwardly into the second sealing zone C. This second sealing zone is possibly best described as having two working areas and is provided with a sealing apparatus, generally designated by the numeral 65, adapted for vertical movement between the two spaced units 16a and 16b as illustrated in FIGS. 7, 8 and 9. Accordingly, during continuous operations of the furnace, the leading edges of one unit 16a in the first working area will be sealed simultaneously with the sealing of the following edges of a preceding unit 16b in the second area and during one vertically upward pass of the sealing apparatus 65.

Before carrying out the sealing of the vertical edges of the glass sheets, a dehydration hole forming member, indicated at E in FIG. 7, is inserted between the following spaced edges of the pair of glass sheets 16b and rests on the inside surface of the bottom sealed edge wall 20. After the vertical side edges of the glass sheets have been sealed and the unit annealed, the member E is removed to provide the customary dehydration hole through which the air space in the unit can be purged with dehydrated air after which the opening is hermetically sealed as is well known in the art.

The sealing apparatus 65 includes a base 66 on which are mounted a pair of fusion gas burners 67 and 68, pairs of edge forming rolls 69 and 70, a pair of internal fusion gas burners 71 and 72 and an air supply device 73 for introducing dehydrated air under pressure into the space between the glass sheets during sealing of the vertical edges thereof according to the present invention. The sealing apparatus 65 is bodily carried at the upper end of a tubular support 74 guided for vertical movement by a roller bracket 75 (FIG. 1) and is associated with a raising and lowering medium, such as the hydraulic cylinder 76. The support 74 is preferably tubular or of hollow cross-section to accommodate the necessary supply conduits for the burners 67, 68, 71 and 72 and the air supply device 73.

As viewed in FIGS. 7 and 9, the fusion burners 67 and 68 are equipped with a plurality of oppositely directed outlet nozzles 77 that are adapted to direct gas flames therefrom against the outside surfaces of the marginal edge portions of the glass sheets 17 and 18 of the units 16a and 16b. Thus, as the burners 67 and 68 are carried upwardly, the edges of the juxtaposed pairs of glass sheets will be heated to a semi-plastic condition and the inner surfaces thereof properly conditioned for sealing or welding together by the associated pairs of forming rolls 69 and 70 to form the integral edge walls of each unit.

In a manner similar to that of the stationary inside burner 60, the burners 71 and 72 are adapted to be received between the glass sheets during the sealing of the vertical side edges thereof. Since, however, the burners 71 and 72 must initially be positioned so as to avoid striking the adjacent ends of the bottom edge walls of units 16a and 16b as the sealing apparatus moves upwardly, each of the burners 71 and 72 is adapted to be swung inwardly and outwardly relative to the vertical sheet edges.

For this purpose, each burner 71 and 72 comprises an arcuately shaped pipe 78 carried by a horizontally disposed tubular support shaft 79 that is rotatably mounted by bearing plates 80 on the base 66. As best seen in FIG. 9, the pipe 78 is tapered at its outer end so that the tip 81 thereof will readily pass between the spaced glass sheets. Each shaft 79 is connected at one of its ends by flexible tubing 82 to a suitable source of combustible gas mixture. At their opposite ends, the shafts 79 are provided with fixedly mounted pinions 83 and 84 respectively. These pinions are rotated by means of a double rack lever 85 that is swingably mounted about a horizontal axis F on the base 66 by bracket 86. The rack lever 85 is formed with an internal gear sector 87, meshing with the pinion 83 of burner 71, and an external gear sector 88, meshing with the pinion 84 of burner 72, to rotate the said pinions in opposite directions and thus swing the burner 71 into operative position between the edges of the pair of sheets 16a and simultaneously swing the burner 72 between the edges of the pair of sheets 16b. The burner tips 81 will thus be positioned as shown in broken lines in FIG. 8 and the flames therefrom will be directed against the inside surfaces of the sheet edges as they are pressed together by the respective pairs of forming rolls 69 and 70 to form the sealed edge walls.

As viewed in FIG. 7, when the sealing apparatus 65 is in its lowermost or rest position, a weight 89 carried by chain 90 connected to the gear sector 87 is supported upon the floor 26 of the furnace, or other means provided for this purpose, at which time the rack lever 85 is counterbalanced by a weight 91 hung from the gear sector 88 by a link 92. This weight 91 acts to maintain the lever against a stop pin 93 carried by the base 66 and the burners 71 and 72 in their withdrawn or inoperative positions. However, upon upward movement of the sealing apparatus 65, the chain 90 becomes straightened out and by reason of the weight 89 causes the rack lever 85 to rotate in a counterclockwise direction until it engages stop 94. Upon continued upward movement of the sealing apparatus, the weight 89 will be lifted to maintain the rack lever in engagement with the stop 94 until the sealing device reaches its uppermost position. As the rack lever is swung counter-clockwise, the gear sectors 87 and 88 rotate the pinions 83 and 84 to swing the burners 71 and 72 into operative position between the glass sheets and to direct flames upon the edge portions of the glass sheets as said edge portions are being urged into contact with one another by the pairs of forming rolls 69 and 70. It is of course desirable that the inside burners 71 and 72 be swung into operative position in timed relation to the upward movement of the burner apparatus 65 so that they will enter the spaces between the glass sheets as close as possible to the lower sealed walls 20.

While the use of the inside burners 71 and 72 has been found highly advantageous in the formation of an edge wall of added strength and increased resistance to breakage, it has also been found that the waste products of combustion resulting from the use of these burners have a tendency to condense on the inner surfaces of the glass sheets and to cause staining of such surfaces during the annealing of the sheets. Due to the residual heat in the glass sheets, the inside surfaces thereof are highly susceptible to reaction with the moisture-laden air thereby causing this objectionable staining to occur. However, as above set forth, the introduction of dehydrated air under pressure into the air space, as provided by the present invention, operates to create a drier atmosphere in which the waste products of combustion from the gas flames will be absorbed and the moisture content thereof materially reduced. As a result during annealing of the glazing units, the moisture content of the contained air will be such that the likelihood of staining of the sheet surfaces will be effectively removed.

In order to prevent the accumulation of residual moisture in the space between the glass sheets or condensation of the waste gas products on the sheet surfaces, the present invention provides means for introducing dehydrated air under pressure between the spaced sheets of glass in advance of the burners 71 and 72 to initially create an atmosphere of drier air into which the waste gas products are exhausted. This is accomplished by the provision of the air supply device 73 which, as shown in FIGS. 7 and 8, comprises a generally T-shaped pipe. The vertical leg 95 of the pipe is secured within the tubular support 74 while the horizontally disposed section 96 thereof is provided at its opposite ends 97 with outlet orifices of reduced area which are positioned close to the adjacent vertical edges of the units 16a and 16b and in registry with the spaces between the glass sheets. As the sealing apparatus 65 moves upwardly, the vertical edges of the glass sheets are progressively heated by the outside burners 67 and 68 and simultaneously dehydrated air is forced into the space between the glass sheets to purge the space of those products of combustion created when the inside burners are brought into operation.

As shown, the horizontal section 96 of pipe 73 is mounted above the base 66 so that the opposite ends 97 thereof will be disposed below the top surfaces of the burners 67 and 68. The continuous circulation of the dehydrated air within the space between the glass sheets will reduce the possibility for the waste products of combustion to condense as water vapor and consequently lower the moisture content within the air space. Whatever air remaining in the space between the glass sheets after sealing of all four edges will be subsequently purged from the glazing unit during the usual process of dehydrating the unit and sealing the dehydration hole which is, of course, done after annealing of the unit.

As the sealing apparatus 65 approaches the upper sealed edges of the glazing units 16a and 16b, the inside burners 71 and 72 are caused by the rack lever 85 to be swung outwardly from between the glass sheets to their inoperative positions. This occurs as the burners 67 and 68 approach the upper edges of the sheets but before the pairs of forming rolls 69 and 70 have completed sealing or welding of the vertical edges together. This is accomplished by a vertically disposed plunger rod 99 that is supported in the top wall 29 of the furnace and which is adapted to engage a plate 100 on the rack lever 85 to swing said rack lever clockwise until it engages the pin 93. The plunger rod 99 is spring loaded so that when the rack lever contacts pin 93 it will move upwardly with the sealing device until the edge forming rolls 69 and 70 are in a position above the upper edges of the glass sheets.

As the sealing device moves downwardly to its initial position and the plate 100 disengages plunger rod 99, it will be apparent that the weight 89 will cause the rack lever 85 to again swing in a counter-clockwise direction and the burners 71 and 72 into their operative positions. This would of course result in their striking the completed vertical edge walls of the units 16a and 16b and to obviate this possibility, and before the sealing apparatus 65 is lowered, the glazing units 16a and 16b are moved away from one another a distance sufficient to enable the sealing apparatus to pass downwardly therebetween to its initial inoperative positions as shown in FIG. 7. The completely sealed glazing unit 16b is then moved into the annealing zone D while the partially sealed unit 16a is moved into the position previously occupied by unit 16b. A new unit 16a having its upper and lower edges sealed is moved into sealing position and the vertical sealing operation repeated. After the completely sealed unit has been annealed, the member E is removed which will provide the customary dehydration hole communicating with the air space between the glass sheets. Dehydrated air is then adapted to be introduced into and circulated through the air space until the moisture content in the unit has been reduced to the desired degree, after which the opening is sealed to complete the unit.

It is to be understood that the form of the invention herewith shown and described is to be taken as a preferred embodiment of the same, but that various changes in the shape, size and arrangement of parts may be resorted to without departing from the spirit of the invention or the scope of the subjoined claims.

I claim:
1. A method of making multiple glass sheet glazing units, which comprises supporting a pair of glass sheets in spaced face-to-face relation, heating the edge portions of the sheets by applying concentrated heat thereto from the outside, urging the heated edge portions toward and into fusion contact with one another progressively from one end of the sheets to the other thereby to fuse said edge portions together to form a sealed edge wall, progressively applying heat to the inner surface of the edge wall as it is being formed, and directing dry air into the space between the glass sheets during the formation of said edge wall.

2. A method of making multiple glass sheet glazing units as claimed in claim 1, in which the glass sheets are supported in a vertical position and in which the heat applied to the inner surface of the edge wall as it is formed is a combustible gas flame and the dry air is supplied at sufficient pressure to reduce condensation of the waste products from the gas flame.

3. A method of making multiple glass sheet glazing units as claimed in claim 1, including supporting the glass sheets in a vertical position, fusing first the upper and lower horizontal edges of the sheets and then the vertical side edges, and introducing dry air between the glass sheets during the fusing of the vertical side edges of said sheets.

4. Apparatus for making multiple glass sheet glazing units, comprising means for supporting a pair of glass sheets in vertical, spaced face-to-face relation, means disposed adjacent said supporting means for heating the edge portions of the glass sheets from the outside to bending temperature, forming means engaging the heated edge portions progressively from one end of the sheets to the opposite end and operable to bring the heated edge portions into fusion contact to form an edge wall, a gas burner disposed adjacent said forming means for directing heat along the inner surface of the edge wall as it is formed, and means mounted adjacent said forming means and said gas burner for introducing dry air under pressure into the space between the glass sheets during formation of said edge wall.

5. Apparatus for making multiple glass sheet glazing units as claimed in claim 4, in which said last-named means comprises a pipe having an outlet orifice at one end directed toward and registering with the space between the glass sheets for supplying dry air at sufficient pressure to reduce condensation of the waste products of combustion from the flame of said gas burner upon the inner surfaces of the glass sheets.

6. Apparatus for making multiple glass sheet glazing units, comprising means for supporting a pair of glass sheets in vertical spaced face-to-face relation, gas burners positioned at opposite sides of said sheets for heating the marginal edge portions thereof to bending temperature, a pair of forming rolls adapted to engage the heated marginal edge portions of the sheets progressively from one end of the sheets to the opposite end and to urge said edge portions into fusing contact with one another to form an edge wall, a second gas burner disposed between the glass sheets for directing heat along the inner surface of the edge wall as it is formed, and means for introducing dry air under pressure into the space between the glass sheets during formation of the edge wall.

7. Apparatus for making multiple glass sheet glazing units as claimed in claim 6, including means for mounting the outside gas burners, the edge forming rolls, the second gas burner and the means for introducing dry air under pressure between the glass sheets to move as a unit relative to the edges of the glass sheets.

8. Apparatus for making multiple glass sheet glazing units as claimed in claim 7, in which the means for introducing dry air under pressure into the space between the glass sheets comprises a pipe carried by said mounting means and having an outlet orifice positioned in advance of said forming rolls to supply dry air between the glass sheets simultaneous with the sealing of the sheet edges together.

References Cited in the file of this patent

UNITED STATES PATENTS

| | | |
|---|---|---|
| 2,194,755 | Kell | Mar. 26, 1940 |
| 2,238,153 | Blau | Apr. 15, 1941 |
| 2,402,387 | Ferguson et al. | June 18, 1946 |
| 2,648,166 | Fisher et al. | Aug. 11, 1953 |

FOREIGN PATENTS

| | | |
|---|---|---|
| 1,157,357 | France | Dec. 30, 1957 |